United States Patent Office 2,813,520
Patented Nov. 19, 1957

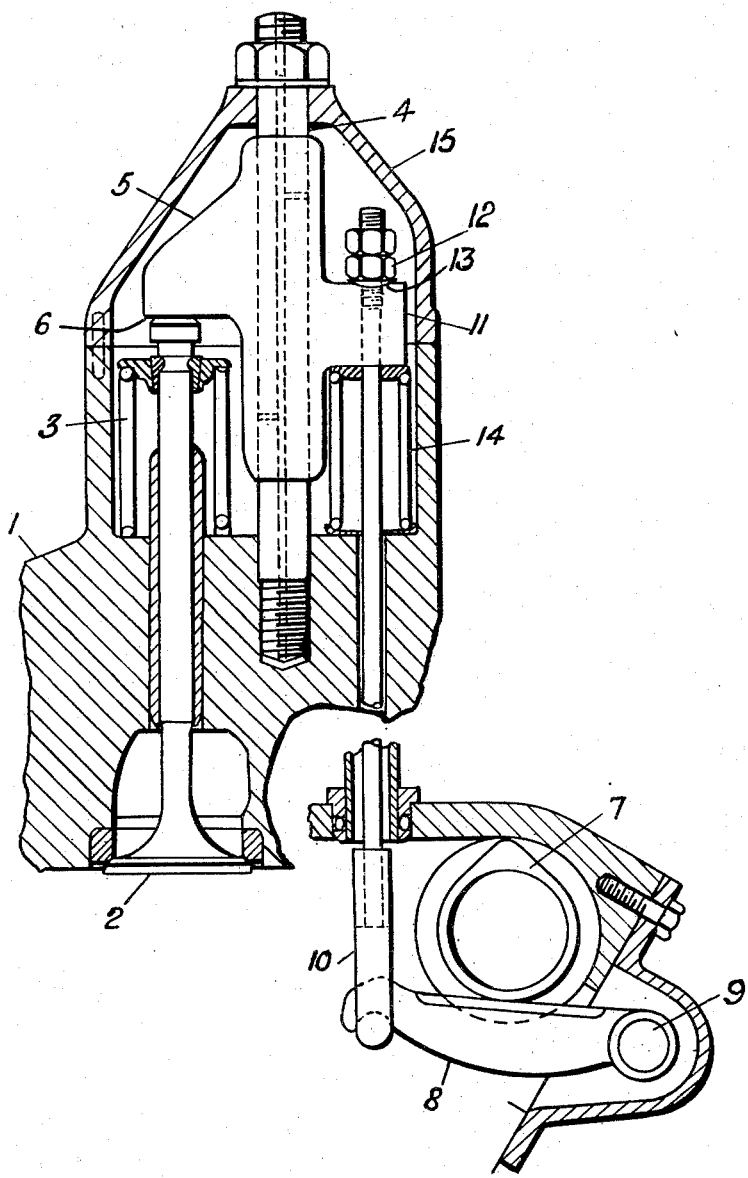

2,813,520
VALVE MECHANISM FOR AN ENGINE

George Herbert Lee, Scotstoun, Scotland, assignor to Albion Motors Limited, Glasgow, Scotland, a corporation of the United Kingdom of Great Britain and Northern Ireland Application July 31, 1956, Serial No. 601,206

4 Claims. (Cl. 123—90)

This invention relates to engines incorporating poppet valves.

According to the invention a valve mechanism for an engine incorporates at least one poppet valve member operatively connected to a cam by means including a pull rod, the cylinder head of the engine presenting a pin the axis of which is parallel to the axis of the stem of the valve member, and a sliding member slidable on the pin, said sliding member being formed with a projection connected to the pull rod and with an abutment engageable with the end of the stem of the valve member.

The end of the pull rod remote from the sliding member may be pivoted to the free end of a radius rod, said radius rod being arranged to receive a lateral thrust from a cam.

The accompanying drawing is a vertical section through one embodiment of a valve mechanism according to the invention.

In the drawing, 1 denotes a cylinder head, and 2 denotes a poppet valve member engaging a seat presented by the cylinder head 1, the valve member 2 being urged towards the seat by the spring 3. 4 denotes a pin screwed into the cylinder head 1, and 5 denotes a sliding member slidable on the pin 4 and presenting an abutment 6 engageable with the end of the stem of the valve member 2. 7 denotes a cam rotatable by the mechanism of the engine and engageable with a lateral face of a radius rod 8 swingable about a fixed pivot 9. The free end of the radius rod 8 is engaged with one end of a pull rod 10 the other end of which extends through a projection 11 on the sliding member 5. The pull rod 10 is fitted with nuts 12 and a spherical washer 13 engaging a correspondingly shaped depression in the projection 11. 14 denotes a balancing spring bearing against the projection 11 and serving to balance the thrust of the valve spring 3. 15 denotes a cap fastened to the cylinder head 1. The end of the pin 4 remote from the cylinder head engages a socket in the cap 15 and is supported by the cap 15.

In practice, as the cam 7 rotates it exerts a lateral thrust on the radius rod 8 which swings about its pivot 9 and the tensile stress generated in the pull rod 10 causes the pull rod to pull the sliding member 5 along the guide pin 4 towards the cylinder head 1, the abutment 6 coming against the end of the stem of the poppet valve member 2 whereby to move the poppet valve member 2 to its open position in opposition to the valve spring 3. Both springs 3 and 14 are compressed. When the lobe of the cam 7 moves out of engagement with the radius rod 8 the valve spring 3 closes the valve, the sliding member 5 being pushed in the direction away from the cylinder head by the action of the valve spring 3 and the balancing spring 14.

What is claimed is:

1. A valve mechanism for an engine incorporating at least one poppet valve member having a stem, a fixed pin the taxis of which is parallel with the axis of the stem of the valve member, a sliding member slidable on said pin and presenting an abutment engageable with the end of said stem, a cam, and a pull rod adapted to receive a thrust as a tensile stress from said cam and transmit said thrust to said sliding member.

2. A valve mechanism as claimed in claim 1 incorporating a balancing spring pressing against the sliding member, said spring being located diametrally opposite the valve member.

3. A valve mechanism as claimed in claim 1 in which a fixed bell-shaped cap member encloses the sliding member and presents a socket engaged with an end of the pin.

4. A valve mechanism as claimed in claim 1 incorporating coupling means presenting mating spherical faces connecting the pull rod and the sliding member.

References Cited in the file of this patent
UNITED STATES PATENTS

| | | |
|---|---|---|
| 1,177,084 | Armitage | Mar. 28, 1916 |
| 1,475,965 | Pence | Dec. 4, 1923 |